July 25, 1950  H. A. WAGNER ET AL  2,516,816
POWER-DRIVEN VEHICLE APPARATUS
Filed June 19, 1944  5 Sheets-Sheet 1

INVENTORS
HAROLD A. WAGNER
GUSTAVE H. WAGNER

By E. G. Buckham
Attorney

INVENTORS
HAROLD A. WAGNER
GUSTAVE H. WAGNER
By E. A. Buckhorn
Attorney

July 25, 1950     H. A. WAGNER ET AL     2,516,816
POWER-DRIVEN VEHICLE APPARATUS Filed June 19, 1944     5 Sheets-Sheet 3

INVENTORS
HAROLD A. WAGNER
GUSTAVE H. WAGNER
By E. G. Brunson
Attorney

July 25, 1950

H. A. WAGNER ET AL 2,516,816

POWER-DRIVEN VEHICLE APPARATUS

Filed June 19, 1944

INVENTORS
HAROLD A. WAGNER
GUSTAVE H. WAGNER

By *E. G. Burkham*

Attorney

July 25, 1950

H. A. WAGNER ET AL 2,516,816

POWER-DRIVEN VEHICLE APPARATUS

Filed June 19, 1944

INVENTORS
HAROLD A. WAGNER
GUSTAVE H. WAGNER

By E. A. Buckhorn

Attorney

Patented July 25, 1950

2,516,816

UNITED STATES PATENT OFFICE 2,516,816

POWER-DRIVEN VEHICLE APPARATUS

Harold A. Wagner and Gustave H. Wagner,
Portland, Oreg.

Application June 19, 1944, Serial No. 540,914

14 Claims. (Cl. 37—126)

1

The present invention relates to heavy duty power driven vehicles such as tractors and the like and, while not necessarily limited thereto it is particularly adaptable for use with earth moving apparatus.

Heavy duty tractor vehicles have heretofore been relatively expensive machines due in part to the common practice of providing a power plant in the form of a single large engine. Such large engines built in small quantities are much more expensive than the total cost of a number of smaller capacity engines of standard or mass production size. Aside from considerations of low initial cost and low maintenance cost, a power plant in the form of a number of such small engines is desirable for numerous other reasons. Furthermore, heavy duty tractors have commonly heretofore been of the crawler type which are not only high in initial cost due to their inherently expensive construction but also have a high maintenance cost due to rapid wear of the traction units. Such tractors are inherently slow and require that other machinery, such as scrapers and the like, be towed therebehind. Such a tractor-scraper combination is inherently clumsy and difficult to maneuver in close quarters such as are frequently encountered in construction projects.

The tractor vehicle of the present invention is described in combination with a scraper unit primarily adapted for heavy duty work, that is, for moving earth in large quantities at a time, for example, of the order of ten to twenty yards or more. It will be obvious that in scraping and transporting earth in such unit quantities a very considerable amount of power will be required and also large traction area. Heretofore crawler type tractors have been almost exclusively used as power plants in connection with earth moving equipment of this size partly because only such tractors could produce a sufficient amount of power and further because only such prime mover vehicles possessed the large traction area required. As distinguished from earth moving equipment of the type generally provided heretofore the machine of the present invention employs wheels equipped with large rubber tires as the traction elements. Wheels as traction elements are very efficient due to their relatively lower frictional resistance as compared with the frictional resistance of crawler units. By arranging a sufficiently large number of such wheels on the machine and furthermore, by providing adequate motive power to each of such wheels a sufficient amount of tractive power can be provided for performing the earth moving operations in the

2 quantities referred to much more efficiently than heretofore.

It is an object of the present invention to provide a new and improved heavy duty, multi-engine, tractor vehicle.

It is a further object of the present invention to provide a new and improved multi-engine tractor of the wheeled type and having power drive on all wheels.

A still further object of the present invention is to provide a new and improved tractor including front and rear wheels with separate prime mover engines, the front and rear wheels being spaced relatively widely apart, the frame between the front and rear wheels being adapted for mounting earth moving apparatus therebeneath.

Another object is to provide a new and improved large capacity earth moving machine of the scraper type driven by prime mover engines mounted thereupon.

Another object is to provide a new and improved power driven steering unit for tractor vehicles.

Another object is to provide a new and improved earth scraper.

Another object is to provide a new and improved earth mover having a receptacle which may be filled either by scraping or by a shovel or the like from above.

A further object is to provide an earth scraper having a new and improved arrangement for emptying it.

In accordance with the illustrated embodiment the invention comprises a tractor vehicle having a steering unit supporting the front end thereof which includes a pair of wheels and a driving motor therefor mounted between the wheels. The rear end of the vehicle is supported by a plurality of pairs of wheels, separate driving motors being provided for each pair and mounted adjacent thereto upon the frame. A scraper unit is mounted between the front and rear wheels, the rear end of the scraper unit being pivotally mounted at the rear end upon the frame. Means are connected to the front end of the scraper whereby it may be raised and lowered with regard to the surface of the ground. Emptying of the scraper is accomplished by a movable rear wall which is operable by a servo-motor. The cab is mounted over the rear wheels and the frame over the scraper receptacle is open in order that it may be filled, if desired, by other means such as a scoop or a bucket.

Other objects and advantages of the invention will appear from the following description taken in connection with the accompanying drawings while the features of novelty will be pointed out with greater particularity in the appended claims.

Figure 1:
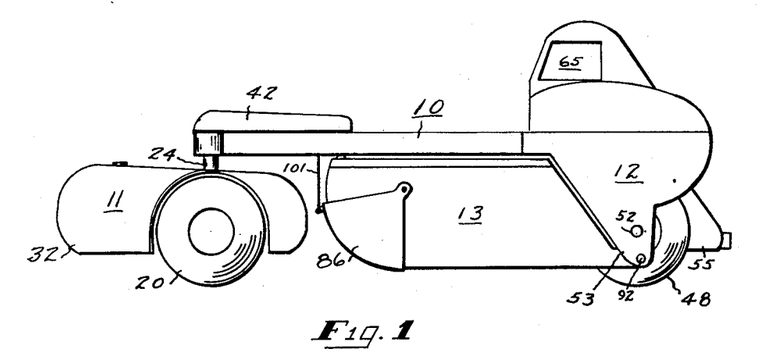
Fig. 1 is a side elevation of the earth moving machine constructed in accordance with one form of the invention.
Figure 2:
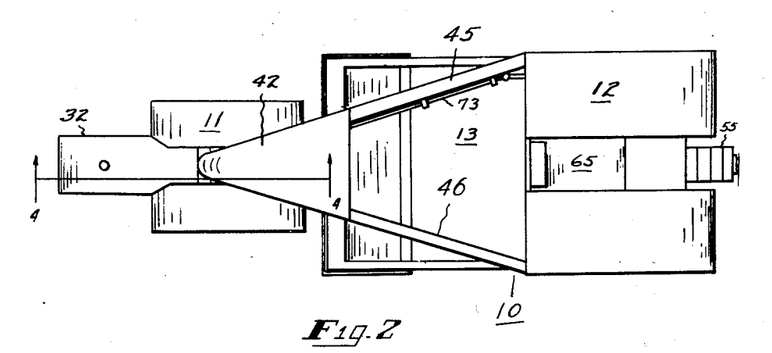
Fig. 2 is a plan view of the machine shown in Fig. 1.
Figure 3:
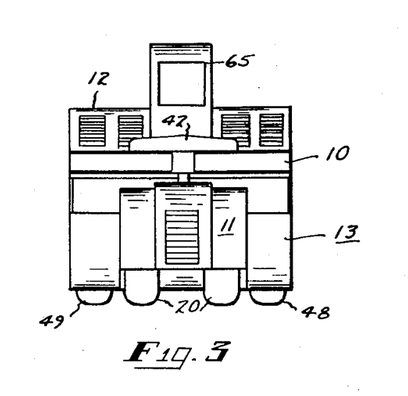
Fig. 3 is a front view of the machine.

Referring now to the drawings, the machine of the invention is comprised essentially of a main frame 10, a front steering unit 11, a rear drive assembly 12 and a scraper unit 13. As illustrated more clearly in the plan view of Fig. 2 the frame unit 10 is of a generally triangular shape being relatively narrow at the front end and relatively wide at the rear end. The front end is supported by the steering unit 11 while the rear end is supported by a plurality of wheels associated with the rear end assembly 12. The scraper unit 13 is of a generally rectangular box-like configuration which is mounted beneath the main frame 10 and between the front and rear wheels of the machine.

Figure 4:
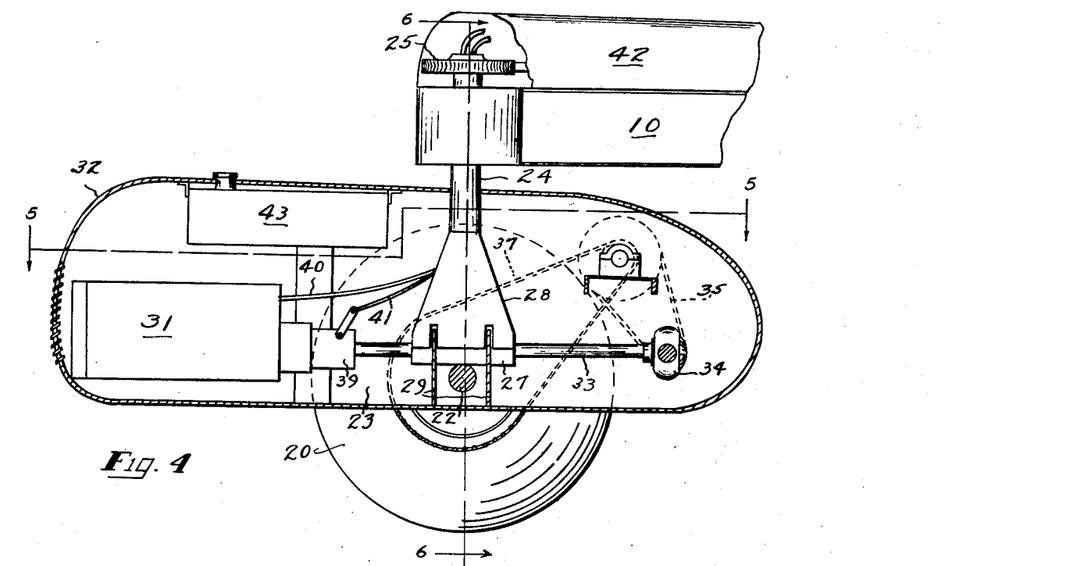
Fig. 4 is a longitudinal sectional view of the steering unit taken substantially along the line 4—4 of Fig. 2.
Figure 5:
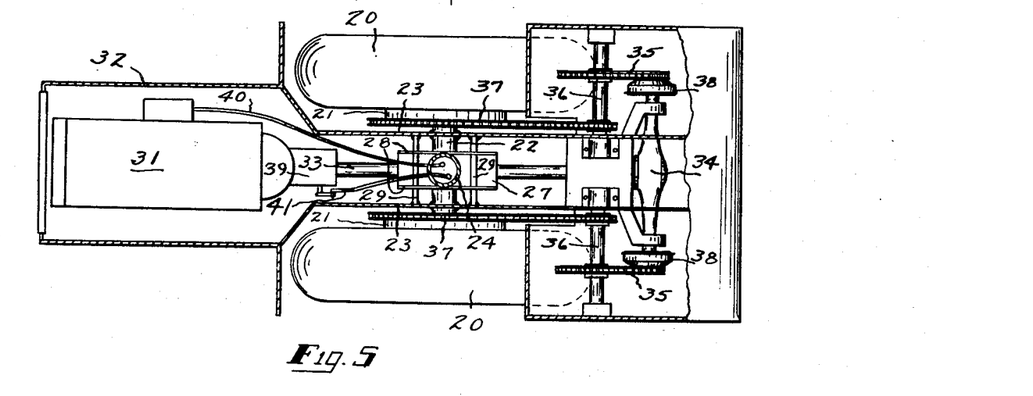
Fig. 5 is a horizontal sectional view taken along the line 5—5 of Fig. 4.
Figure 6:
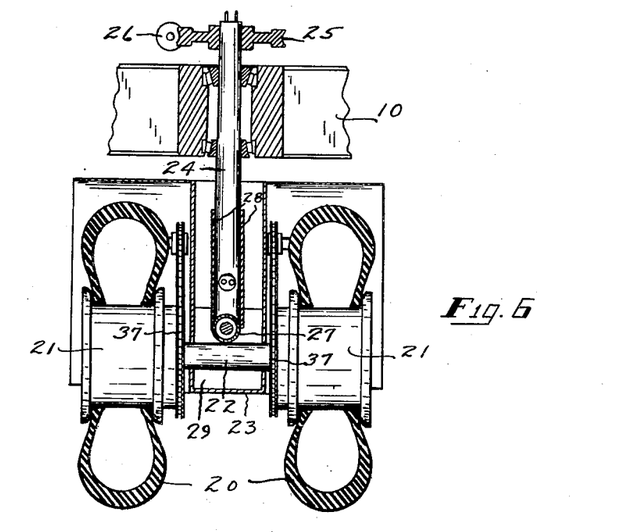
Fig. 6 is a sectional view taken along the line 6—6 of Fig. 4.
Figure 7:
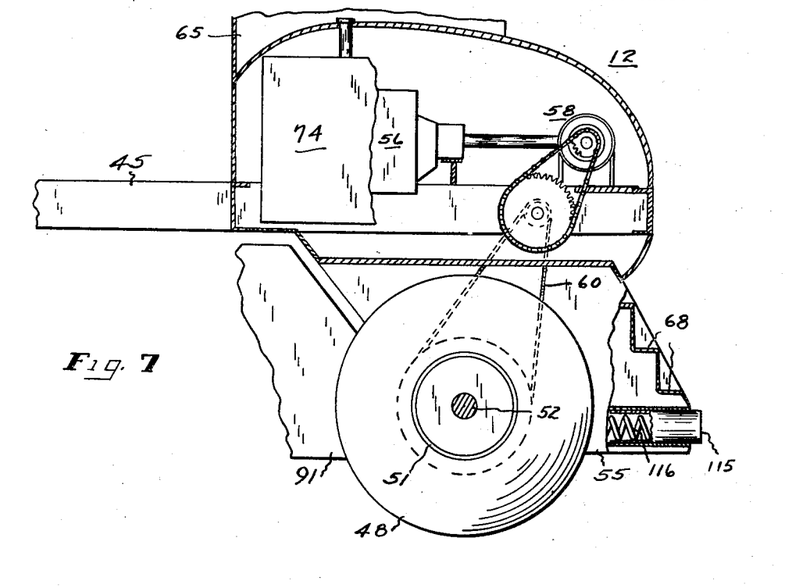
Fig. 7 is a side elevation of the rear end portion of the machine, parts being broken away to illustrate certain details.

Referring to Figs. 4, 5 and 6, the steering unit 11 will now be described. The steering unit comprises a pair of wheels 20 which are mounted upon drums 21, the drums being journaled for free rotation upon a shaft 22 which shaft is rigidly secured to the rectangular frame portion 23 extending between the wheels and defining the carriage. The steering unit is supported by a tubular column 24 which is journaled within vertically arranged bearings in the foremost end of the frame 10 as more clearly illustrated in the view of Fig. 6. A ring gear 25 is secured to the top of the column 24 and is meshed by a worm 26 through which the steering movements of the unit 11 are controlled. Rigidly secured to the bottom of the column 24 and at right angles with respect thereto is a cylindrical member 27, stiffening plates 28 being provided on each side of the column 24 for further securing the member 27 thereto.

The cylindrical member 27 is journaled within a pair of transversely extending plates 29 extending between the opposite side walls of the rectangular frame 23 between the wheels. The plates 28 are suitably cut out to provide clearance around the upper edges of the plates 29. With this supporting arrangement it will be obvious that the steering unit may rock transversely about the axis of the cylindrical member 27 to permit the wheels 20 to maintain contact with the ground even in passing over irregularities. While the frame may rock laterally it is always maintained horizontal in the longitudinal direction or longitudinally parallel with the main frame 10.

A prime mover driving motor 31 is mounted within the enlarged forward end 32 of the steering unit frame structure 23, the drive shaft 33 therefrom extending through the cylindrical member 27 to the differential 34 arranged in the rear of the carriage. Power is transferred from the differential unit 34 through drive chains 35, intermediate shafts 36 and drive chains 37 to the corresponding wheels 20. Brake drums 38 may be provided in the drive connection for further control of the power transmission. A fuel tank 43 is mounted within the upper part of the front unit housing.

The motor 31 may be controlled from the operator's compartment on the rear end of the machine by any suitable connection thereto such as the connections indicated at 40 and 41. It will be understood, of course, that the remote control for the motor 31 may be effected through either pneumatic, hydraulic, electrical or other connection means well known in the art. The control connections of the type selected may be introduced into the steering unit through the hollow center of the steering column 24 as indicated. The motor 31 is preferably provided with an automatic variable power transmission means 39 so that full power will be transmitted from the motor to the wheels irrespective of the speed of rotation of the wheels 20. Such power transmission units are available in various forms such as fluid couplings or automatic shifting transmissions and need not be described here in greater detail. The use of such a power transmission for the steering unit materially simplifies the control of the motor 31 so that it need not occupy the attention of the operator of the machine once it is put into operation. The steering movements of the unit 11, that is, the angular rotation of the column 24 is preferably effected through the worm gear arrangement 25—26 by motive power. Such power may be supplied by a prime mover engine mounted upon the main frame of the machine and which may be operatively connected to a gear box 42 which is identified in the drawings merely by a housing provided atop the front end of the frame 10. The gear box includes necessary clutches and other control means all of which may be manipulated by remote control from the operator's cab as desired. Such details may be supplied by one skilled in the art and inasmuch as they form no part of the present invention they are not described here in detail. The control connections between the gear box 42 and the operator's compartment may extend through the hollow beam members defining the frame 10 between the front and rear ends of the machine.

The frame 10 of the vehicle is relatively narrow at the forward end which is supported upon the steering unit 11 and is relatively broad at its rear end. As illustrated more clearly in the plan view Fig. 2 the frame 10 includes a pair of beam members 45 and 46 which diverge toward the rear of the vehicle, the space between the girders being preferably open for reasons that will become apparent as the description proceeds.

The rear end of the vehicle is supported by a plurality of axially aligned pairs 48 and 49 of rear wheels, one pair being arranged at each of the opposite sides of the frame. The wheels of each pair are arranged relatively closely together and fixedly mounted with respect to each other upon drums 51 rotatably mounted upon axles 52 the opposite ends of which axles are secured in the downwardly depending leg portions of the vehicle frame. The wheels of each pair being arranged relatively closely together describe arcs of substantially the same radius in traveling a curved course so that they may be rigidly mounted relative to each other without resulting in undue wear of the tires. The number of pairs of rear driving wheels may be varied as desired in order to provide the necessary traction for the motive power. With two pairs of rear driving wheels these may be conveniently mounted between a pair of opposite side frame legs 53 and 54 and a center leg 55.

A separate prime mover engine is preferably provided upon the rear end of the vehicle frame within the machinery enclosure 12 for each pair of rear driving wheels. As illustrated more particularly in the views of Figs. 8 and 9 each such prime mover engine 56 and 57 is mounted directly over the corresponding pair of rear wheels and is connected thereto by a suitable power transmission mechanism indicated generally at 58 and 59 respectively. The drive connection may for convenience be made through drive chains 60 and 61 trained about sprockets arranged on the drums 51 between the wheels.

A control compartment 65 is provided upon the rear end of the vehicle frame within which the operator may ride and manipulate the controls illustrated as comprising a plurality of levers 66 which may be connected through any suitable means with the various motors and other elements of the machine requiring control. The operator's compartment preferably projects a suitable distance above all remaining parts of the machine in order that the operator seated therein can obtain an unobstructed view in all directions of the ground upon which he is working the machine. Access may be had to the compartment through a door 67 provided in the rear side thereof. A number of steps 68 are formed on the central frame leg 55 further facilitating mounting of the machine.

Mounted outboard with respect to the engine 57 is a still further engine 71 which is turned end for end with regard to engines 56 and 57 and which engine is connected by the drive shaft 73 to the gear box 42 on the forward end of the frame 10. The engine 71 may also provide the miscellaneous requirements for power on the machine such as pressure fluid for hydraulic systems, and the like. This motor is capable of control separately from motors 56 and 57 which latter engines may, for greater convenience, be interconnected for dual operation. A fuel tank 74 may be mounted in the space beside the engine 56.

It will be obvious to those skilled in the art that the vehicle thus far described constitutes a form of a tractor which may be adapted for performing work with different types of tools or implements. By incorporating a multiplicity of motors in the power plant advantage may be taken of the relatively low cost of the smaller sized engines. Thus a substantially unlimited amount of power may be provided in the tractor without requiring a special design of the power plant as would be required in the case a single engine were embodied. Advantage may also be taken of the high efficiency to which standardized truck engines, for example, have been developed and also of the low replacement and maintenance costs for such engines.

Figure 10:
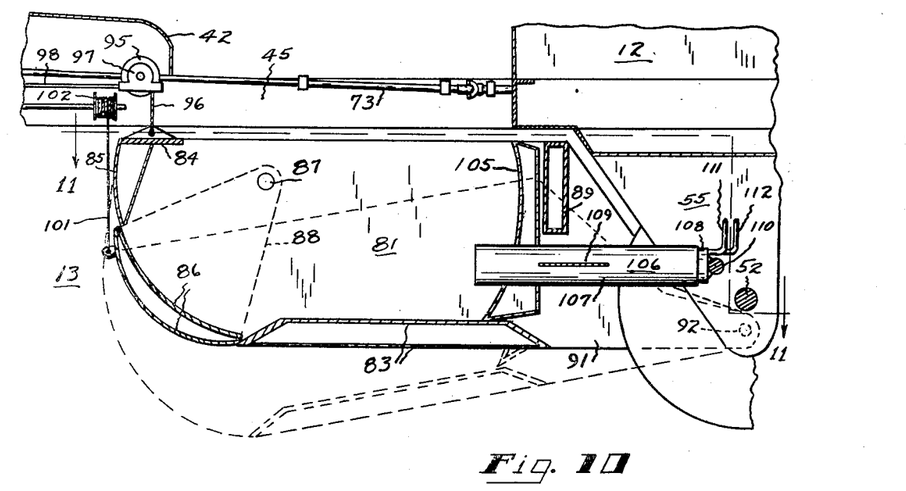
Fig. 10 is a longitudinal sectional view illustrating in particular the details of the scraper unit taken along the line 10—10 of Fig. 11.
Figure 11:
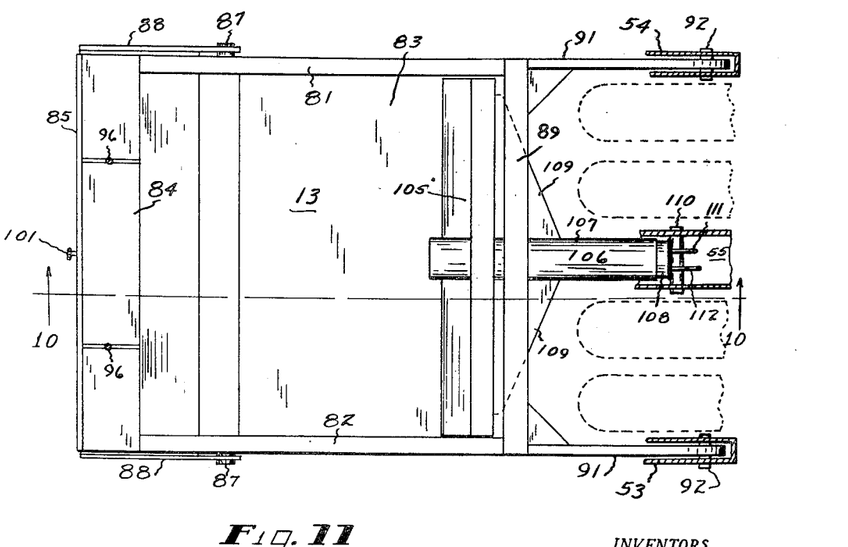
Fig. 11 is a plan view taken along the line 11—11 of Fig. 10.

The tractor in this instance is equipped with a scraper unit 13 mounted beneath the frame 10 between the front and the rear wheels. The scraper is of a generally rectangular, box-like configuration comprising a pair of opposite side walls 81 and 82 which walls are rigidly secured together by a bottom 83, which is of a double wall construction for purposes of strength and rigidity. The upper foremost corner of the side walls are secured together by a top strip 84 and a front strip 85. A gate 86, shown of double walled construction is hingedly mounted as at 87 to the side walls by means of arms 88. The upper rear corner of the side walls are joined together by a transverse wall section 89. The side walls 81 and 82 are provided with rearward extensions 91 which are hingedly mounted as at 92 in the lower extremities of the frame legs 53 and 54 below the axis of the rear wheels. The forward end of the scraper is adapted to be raised and lowered relative to the surface of the ground by suitable elevating means provided on the frame 10. As illustrated in this instance and shown most clearly in the view of Fig. 10 the elevating means comprises a pair of winch drums 95 having cables 96 thereon fastened to the upper surface of the transverse strip 84 of the forward end of the scraper unit. The winch drums 95 are mounted on transverse shaft driven through a worm gear unit 97, which is in turn driven by shaft 98 extending to the power transmission within the gear housing 42. Raising and lowering of the gate 86 may be effected by means of a cable 101 which is secured to the gate and trained over a winch drum 102 provided in the lower rear end of the gear box 42.

Unloading of the scraper 13 may be effected by means of the forwardly movable rear wall, or tail gate, 105 of the scraper which is adapted to be operated by a hydraulic servo-motor 106. The rear wall 105 is preferably of box construction to provide the requisite strength, the forward surface being concavely curved and particularly the lower edge portion in order that when it is moved forwardly to eject a load of dirt from the scraper a force will be imposed upon the lower edge portion tending to hold the gate down against the bottom of the scraper. It will readily be understood that unless this were done clay or the like might adhere to the bottom of the scraper and build up thereupon to a thickness which might be objectionable. With the type of structure shown the gate unit 105 may be mounted loosely within the scraper and guided therein only by the opposite side walls 81—82. The hydraulic operating device 106 for the tail gate 105 comprises a pair of telescopic tubes 107 and 108, the outer tube 107 being rigidly secured to the tail gate 105 and further braced with regard thereto by oppositely extending web plates 109. The inner tube 108 is hingedly mounted by shaft 110 to the central depending leg 55 of the vehicle frame. The servo-motor piston (not shown) may be provided within the inner tube 108 while pressure fluid may be supplied to the opposite sides thereof through the flexible tubular connections 111 and 112. By virtue of the pivotal mounting for the rear end of the servo-motor device and further because the tail gate 105 rests loosely within the scraper the raising and lowering movements of the scraper 13 are not interfered with notwithstanding the eccentricity of the pivotal mountings 92 and 110 for the scraper 13 and the hydraulic operating unit 106 respectively.

Figure 8:
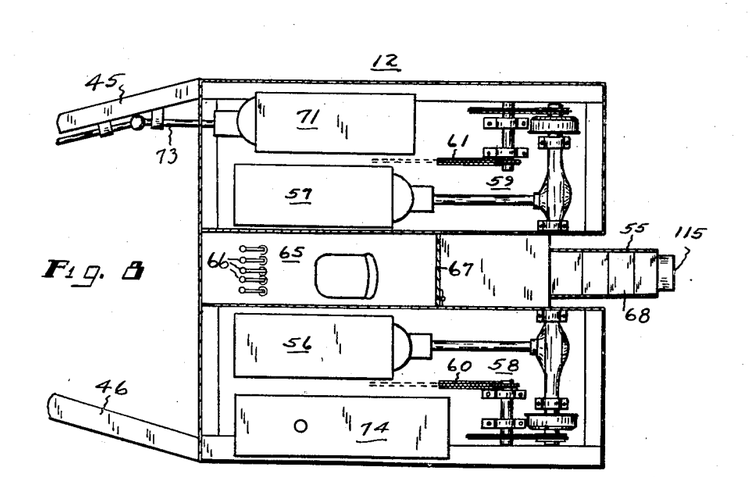
Fig. 8 is a plan view of the interior of the rear end portion of the machine.
Figure 9:
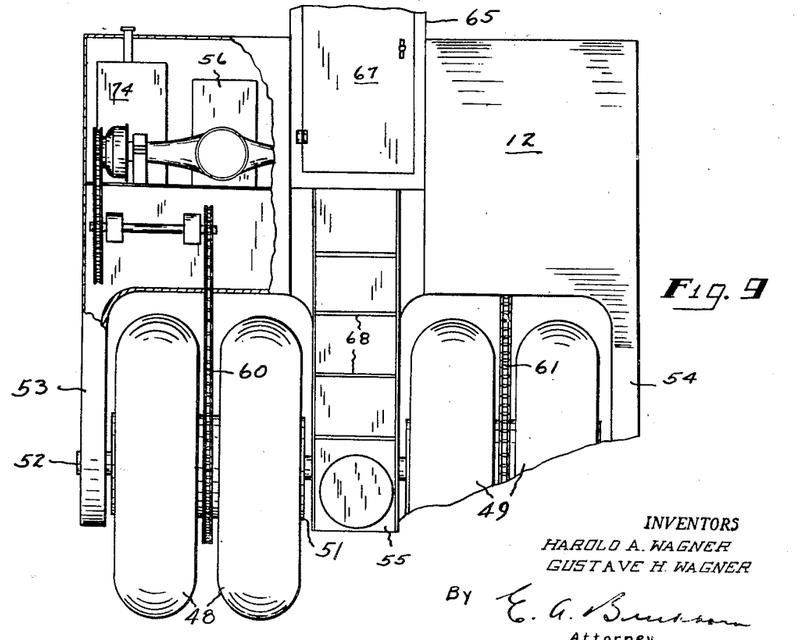
Fig. 9 is a rear view of the machine with portions of the housing broken away.

Referring particularly to Fig. 8, attention is directed to the pusher post 115 comprising a heavy walled cylindrical member provided telescopically within a cooperating tubular member built in and rigidly secured in the lower portion of the central leg 55 of the frame structure. A suitable spring 116 provides resiliency to the post 115 for absorbing shocks. It will be observed that this lower portion of the leg 55 projects rearwardly of the machine while the post 115 provides an abutment against which a booster tractor may bear for assisting the prime mover engines of the machine should such assistance be required.

Having described the invention in what is considered to be a preferred embodiment thereof, it is desired that it be understood that the specific details shown are merely illustrative and that the invention may be carried out by other means.

We claim:

1. A tractor vehicle comprising a frame, said frame being relatively narrow at the front end and relatively wide at the rear end, a steering unit supporting the front end of said frame, said unit including a pair of relatively closely spaced wheels and a prime mover engine operatively connected thereto, the mounting for said unit comprising a vertical column, said unit being movable about the axis of said column, the rear end of said frame including a plurality of downwardly depending leg portions, a plurality of wheels arranged between the said leg portions and supporting the rear end of said vehicle, prime mover engine means mounted on said frame above said wheels and operatively connected thereto, said frame between said front and rear ends comprising a pair of longitudinally extending beams being spaced apart and providing an opening therebetween, said beams extending substantially horizontally and at a height greater than the top of said wheels.

2. The combination comprising a vehicle, a steering unit supporting the forward end of said vehicle, said steering unit including an elongated frame, said frame being relatively narrow at its midsection, a transversely extending shaft rigidly secured to said frame at said narrow portion thereof, a supporting wheel rotatably mounted on said shaft on each of the opposite sides of said frame, a motor mounted in the enlarged forward end of said frame, power transmission means mounted in the enlarged rear portion of said frame, a drive shaft connecting said motor and said power transmission means, drive connection between said power transmission means and each of said wheels, a vertical column mounting the forward end of said vehicle on said unit, means for rotating said column about the axis therefor for effecting steering of said vehicle, bearing means securing the lower end of said column to said frame, said bearing means permitting relatively transverse rocking movements of said unit about an axis extending longitudinally of said frame, said bearing means maintaining said frame longitudinally in a substantially horizontal position.

3. A tractor vehicle comprising a frame, a steering unit supporting the front end of said frame, said unit being pivotally mounted for movement about a vertical axis, said unit including a pair of relatively closely spaced wheels and a prime mover motor operatively connected thereto, the rear end of said frame including a plurality of downwardly depending legs, a plurality of wheels arranged between said depending legs, prime mover engine means mounted on said frame above said last mentioned wheels and operatively connected thereto, one of said plurality of legs being arranged substantially centrally of said vehicle and having a lower portion extending rearwardly beyond the periphery of said last mentioned wheels, means defining an abutment on the lowermost portion of said central leg for engagement by a booster vehicle.

4. A tractor vehicle comprising a frame, a steering unit supporting the front end of said frame, said unit being pivotally mounted for movement about a vertical axis, said unit including a pair of relatively closely spaced front wheels and a prime mover engine operatively connected thereto, a plurality of legs secured to the rear portion of said frame and depending downwardly therefrom including one leg arranged substantially centrally of said vehicle and two outer legs, a plurality of rear wheels rotatably mounted between said central leg and each outer leg, prime mover engines mounted on said frame above said rear wheels, driving connections between said last mentioned engines and said rear wheels, said central leg extending rearwardly of the remainder of said vehicle, means in the lower portion of said central leg defining a resilient abutment for engagement by a pusher vehicle.

5. A tractor vehicle comprising horizontal frame, a steering unit supporting the front end of said frame, said unit including a pair of relatively closely spaced wheels and a prime mover engine operatively connected thereto, the mounting for said unit comprising a vertical column, the front end of said frame being supported upon the upper end of said column, said unit being movable about the axis of said column throughout an angle substantially greater than 180° beneath said frame, a plurality of legs depending downwardly from the rear end of said frame, a plurality of rear wheels mounted between said legs, prime mover engines mounted upon said frame above said rear wheels and operatively connected thereto, said frame between said front and rear wheels extending at a height greater than the top of said wheels providing a space therebeneath for the mounting of an earth working element.

6. A tractor vehicle comprising a frame, said frame being relatively narrow at the front end and relatively wide at the rear end, a steering unit supporting the front end of said frame, said unit including a pair of independently rotatable wheels and a prime mover engine, differential gearing connecting said engine to both of said wheels, said unit being movable about a vertical axis for steering said vehicle, a plurality of pairs of axially aligned wheels supporting the rear end of said frame, the wheels of each pair being relatively closely spaced and rigidly mounted relative to each other, a plurality of drums rotatably mounted on said frame and each supporting a pair of said rear wheels, a plurality of prime mover engines mounted on said frame each being operatively connected to a corresponding one of said drums between the pair of wheels mounted thereon.

7. A tractor vehicle comprising a frame, said frame being relatively narrow at the front end and relatively wide at the rear end, a steering unit supporting the front end of said frame, said unit being pivotally mounted for movement about a vertical axis, said unit including a pair of relatively closely spaced wheels and a prime mover motor operatively connected thereto, the mounting for said unit including a hinged connection permitting transverse rocking movement of said unit, a pair of relatively closely spaced wheels supporting each of the opposite sides of the rear end of said frame, a plurality of prime mover engines mounted on said frame, a plurality of laterally aligned legs depending downwardly from the rear end of said frame, a plurality of drums each being rotatably mounted between an adjacent pair of said legs, each of said pairs of wheels being mounted upon a corresponding one of said drums, and driving connections between said last mentioned engines and to corresponding ones of said drums.

8. The combination comprising a vehicle including a rigid generally triangularly shaped frame, a steering unit arranged beneath and supporting the narrow forward end of said frame, said steering unit comprising a pair of wheels and a motor mounted therebetween for driving said wheels, a plurality of wheels arranged beneath and supporting the wide rear end of said frame, motor means on said frame for driving said rear wheels, an earth moving unit pivotally mounted at opposite sides adjacent the rear end thereof to said frame and extending forwardly toward said steering unit, said earth moving unit extending wholly beneath said frame, and means mounted on the narrow forward end of said frame and connected to the forward end of said earth moving unit for effecting raising and lowering thereof relative to the surface of the ground.

9. The combination comprising a vehicle including a generally triangularly shaped rigid frame, a steering unit including a pair of front wheels and a motor arranged beneath and supporting the narrow forward end of said frame, a pair of legs depending downwardly from each of the opposite sides of the wide rear end of said frame, a plurality of rear wheels arranged between said legs, a second prime mover motor means mounted on said frame above said rear wheels and connected to said rear wheels, an earth moving unit pivotally mounted at opposite sides upon said legs, lift means mounted on the forward narrow portion of said frame and connected to a forward portion of said earth moving unit for effecting raising and lowering thereof relative to the surface of the ground, and a third prime mover motor means mounted on said frame and connected to said lift means.

10. In combination a generally triangularly shaped frame relatively narrow at the front end and relatively wide at the rear end, a steering unit including a pair of wheels arranged beneath and supporting the narrow front end of said frame, a pair of outer legs secured to the opposite rear sides of said frame and depending downwardly therefrom, a central leg secured to the rear portion of said frame and depending downwardly therefrom between said outer legs, rear wheels arranged between each of said outer legs and said central leg, a scraper extending wholly beneath said frame and pivotally connected at the rear end on opposite sides thereof to said outer legs, a movable end wall within said scraper for effecting emptying thereof and servo-motor means pivotally mounted on said central leg and connected to said end wall for effecting emptying operation of said scraper.

11. In a vehicle of the class described, a pair of longitudinal horizontal frame members, said frame members being spaced relatively widely apart at the rear end of said vehicle and converging together at the front end of said vehicle, a steering unit including a pair of front wheels, a vertical column supporting the forward end of said frame upon said steering unit, means on said frame operatively connected to the upper end of said column for effecting steering control of said steering unit, a pair of legs depending downwardly from the rear ends of said horizontal frame members, a plurality of rear wheels rotatably mounted between said legs, prime mover motor means mounted on said frame and operatively connected to said rear wheels, a scraper unit arranged between said front and rear wheels, said scraper being hingedly connected at the rear end to the lower extremities of said legs beneath the axis of said rear wheels, means on the forward end of said frame and connected to the forward portion of said scraper for effecting raising and lowering thereof, said scraper extending wholly beneath said frame, the space between said longitudinal frame members being open to permit filling of said scraper from above.

12. In a vehicle of the class described, a frame, front and rear wheels supporting opposite ends of said frame, a generally boxlike scraper arranged between said front and rear wheels, said scraper comprising opposite side walls and a bottom wall rigidly secured together, rearward extensions of said side walls being pivotally connected to rear portions of said frame, a rear wall portion extending between and rigidly connected at opposite ends to said side walls, a movable wall extending transversely of said scraper, hydraulic motor means pivotally connected at the rear end to said frame and extending beneath said end wall into said scraper, said motor means including an outer cylinder rigidly secured to said movable wall midway between its opposite ends, and laterally extending bracket members secured to said cylinder behind said movable wall and to the opposite side portions of said movable wall, said motor means being operative for pushing scraper contents from the forward end thereof.

13. In a vehicle of the class described the combination comprising a frame, front and rear wheels supporting opposite ends of said frame, a scraper arranged between said front and rear wheels, said scraper being of generally boxlike configuration and including opposite side walls and a bottom wall rigidly connected together, a transversely extending member rigidly secured at opposite ends to said side walls, said member being spaced above said bottom wall, a transversely extending movable wall arranged within said scraper, a hydraulic motor pivotally connected at its rear end to said frame, said motor including an outer cylinder extending through and rigidly connected to said movable wall midway between its opposite ends, and laterally extending bracket members secured to said cylinder behind said movable wall and connected to the opposite side portions of said movable wall, said cylinder extending beneath said transverse member.

14. In a vehicle of the class described, a frame, front and rear wheels supporting opposite ends of said frame, a generally boxlike scraper arranged between said front and rear wheels, said scraper being hingedly mounted at its rear end to said frame, said scraper including a pair of opposite side walls and a bottom wall rigidly connected together, a transversely extending member rigidly secured at its opposite ends to said opposite side walls adjacent the rear end thereof, the lower edge of said member being spaced a considerable distance above said bottom wall, a movable transverse wall mounted within said scraper, a hydraulic motor hingedly mounted at its rear end to said frame and extending centrally into said scraper beneath said member, said motor including an outer cylinder extending through and rigidly welded to said movable wall midway between its opposite ends, and laterally extending bracket members secured to said cylinder behind said movable wall and connected to the opposite side portions of said movable wall, means mounted on the forward end of said frame and connected to the forward portion of said scraper for effecting raising and lowering movments of said scraper.

HAROLD A. WAGNER.
GUSTAVE H. WAGNER.

REFERENCES CITED

The following references are of record in the file of this patent:

UNITED STATES PATENTS

| Number | Name | Date |
|---|---|---|
| 1,095,127 | Senderling | Apr. 28, 1914 |
| 1,175,263 | Hird | Mar. 14, 1916 |
| 1,186,310 | Hackney | June 6, 1916 |
| 1,232,629 | Wade | July 10, 1917 |
| 1,244,221 | Lydell | Oct. 23, 1917 |
| 1,261,263 | Meyers | Apr. 2, 1918 |
| 1,269,347 | Walker | June 11, 1918 |
| 1,453,231 | Wheelock | Apr. 24, 1923 |
| 1,530,779 | Le Tourneau | Mar. 24, 1925 |
| 1,569,011 | Gilbert | Jan. 12, 1926 |
| 1,571,236 | Dieckmann | Feb. 2, 1926 |
| 1,712,162 | Parrett | May 7, 1929 |
| 1,815,252 | Grigsby | July 21, 1931 |
| 1,877,126 | Greer | Sept. 13, 1932 |
| 1,878,139 | Hertner | Sept. 20, 1932 |
| 2,095,759 | Maloon | Oct. 12, 1937 |
| 2,152,700 | Le Bleu | Apr. 4, 1939 |
| 2,195,607 | Wilson et al. | Apr. 2, 1940 |
| 2,202,810 | Blanc | June 4, 1940 |
| 2,204,033 | Austin | June 11, 1940 |
| 2,252,763 | French | Aug. 19, 1941 |
| 2,255,240 | Bird | Sept. 9, 1941 |
| 2,263,028 | Brownell | Nov. 18, 1941 |
| 2,273,010 | Austin | Feb. 17, 1942 |
| 2,280,439 | McLean | Apr. 21, 1942 |
| 2,301,641 | Pendleton | Nov. 10, 1942 |
| 2,347,882 | Chaote et al. | May 2, 1944 |
| 2,363,178 | Harbers et al. | Nov. 21, 1944 |
| 2,368,202 | Clark | Jan. 30, 1945 |

FOREIGN PATENTS

| Number | Country | Date |
|---|---|---|
| 792,974 | France | Nov. 7, 1935 |